(12) United States Patent
Sumitomo

(10) Patent No.: US 7,733,947 B2
(45) Date of Patent: Jun. 8, 2010

(54) DATA TRANSCEIVING METHOD AND DATA TRANSCEIVING EQUIPMENT

(75) Inventor: Katsuyuki Sumitomo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2457 days.

(21) Appl. No.: 10/117,097

(22) Filed: Apr. 8, 2002

(65) Prior Publication Data

US 2002/0146068 A1    Oct. 10, 2002

(30) Foreign Application Priority Data

Apr. 9, 2001    (JP) ............................. 2001-109751

(51) Int. Cl.
 *H04B 1/38* (2006.01)
(52) U.S. Cl. .................. 375/219; 375/238; 375/368; 375/369; 375/370; 370/212; 370/505; 341/53; 341/61
(58) Field of Classification Search .............. 342/52, 342/55, 70, 175; 710/110, 365; 375/242, 375/238, 369–370, 354, 225, 282, 286, 293, 375/259, 288, 364, 368, 328, 109, 219, 377; 370/503, 545, 509, 510, 330, 329, 335, 332, 370/212, 205, 504–505, 470, 472, 477, 546; 714/800, 712, 52, 18; 341/50, 53, 67–69; 329/312; 332/109
See application file for complete search history.

(56) References Cited

U.S. PATENT DOCUMENTS

| | | | | | |
|---|---|---|---|---|---|
| 4,586,189 | A | * | 4/1986 | Tyrrell ..................... 375/370 |
| 4,897,854 | A | * | 1/1990 | Harris et al. ............... 375/286 |
| 5,418,526 | A | * | 5/1995 | Crawford .................. 370/464 |
| 5,436,897 | A | * | 7/1995 | Cook ........................ 370/212 |
| 5,600,782 | A | * | 2/1997 | Thomson ....................... 714/4 |
| 5,602,745 | A | * | 2/1997 | Atchley et al. .............. 705/413 |
| 5,761,074 | A | * | 6/1998 | Nakamura .................... 702/75 |
| 5,778,201 | A | * | 7/1998 | Scalise ....................... 710/305 |
| 6,307,867 | B1 | * | 10/2001 | Roobol et al. ............... 370/470 |
| 6,467,065 | B1 | * | 10/2002 | Mendez et al. .............. 714/800 |
| 6,542,947 | B1 | * | 4/2003 | Buhring ...................... 710/107 |

(Continued)

FOREIGN PATENT DOCUMENTS

JP    01-091534 A    4/1989

(Continued)

OTHER PUBLICATIONS

Maxim SPI/microwire-compatible UART , Jul. 1999.*

(Continued)

*Primary Examiner*—Mohammad H Ghayour
*Assistant Examiner*—Sophia Vlahos
(74) *Attorney, Agent, or Firm*—Sughrue Mion, PLLC

(57) ABSTRACT

A special data including communication wire continuous dominant levels of a number of N more than the transceiving bit number of n of communication wire continuous dominant levels, set in a character as one unit of communication data, can be transceived by a widely-used serial communication interface such that a predetermined transmission rate is changed to n/N times the transmission rate only when the special data is transmitted, whereby the special data can be easily transceived at a low cost.

12 Claims, 15 Drawing Sheets

U.S. PATENT DOCUMENTS

| | | |
|---|---|---|
| 6,865,626 B1 * | 3/2005 | Lo et al. .................. 710/52 |
| 6,959,014 B2 * | 10/2005 | Pohlmeyer et al. ......... 370/514 |
| 2002/0101884 A1 * | 8/2002 | Pohlmeyer et al. ......... 370/509 |

FOREIGN PATENT DOCUMENTS

| | | |
|---|---|---|
| JP | 11-513231 | 11/1999 |
| JP | 2001-044899 A | 2/2001 |

OTHER PUBLICATIONS

Home page of Local Interconnect Network (lin) www.lin-subbus.org.
Local Interconnect Nework (lin), The Lin Concept www.lin-subbus.org/overview/concept.htm.
LIN Protocol Specification, Revision 1.2.
Official Action issued by Japanese Patent Office mailed on Jan. 16, 2007.

* cited by examiner

F I G. 4
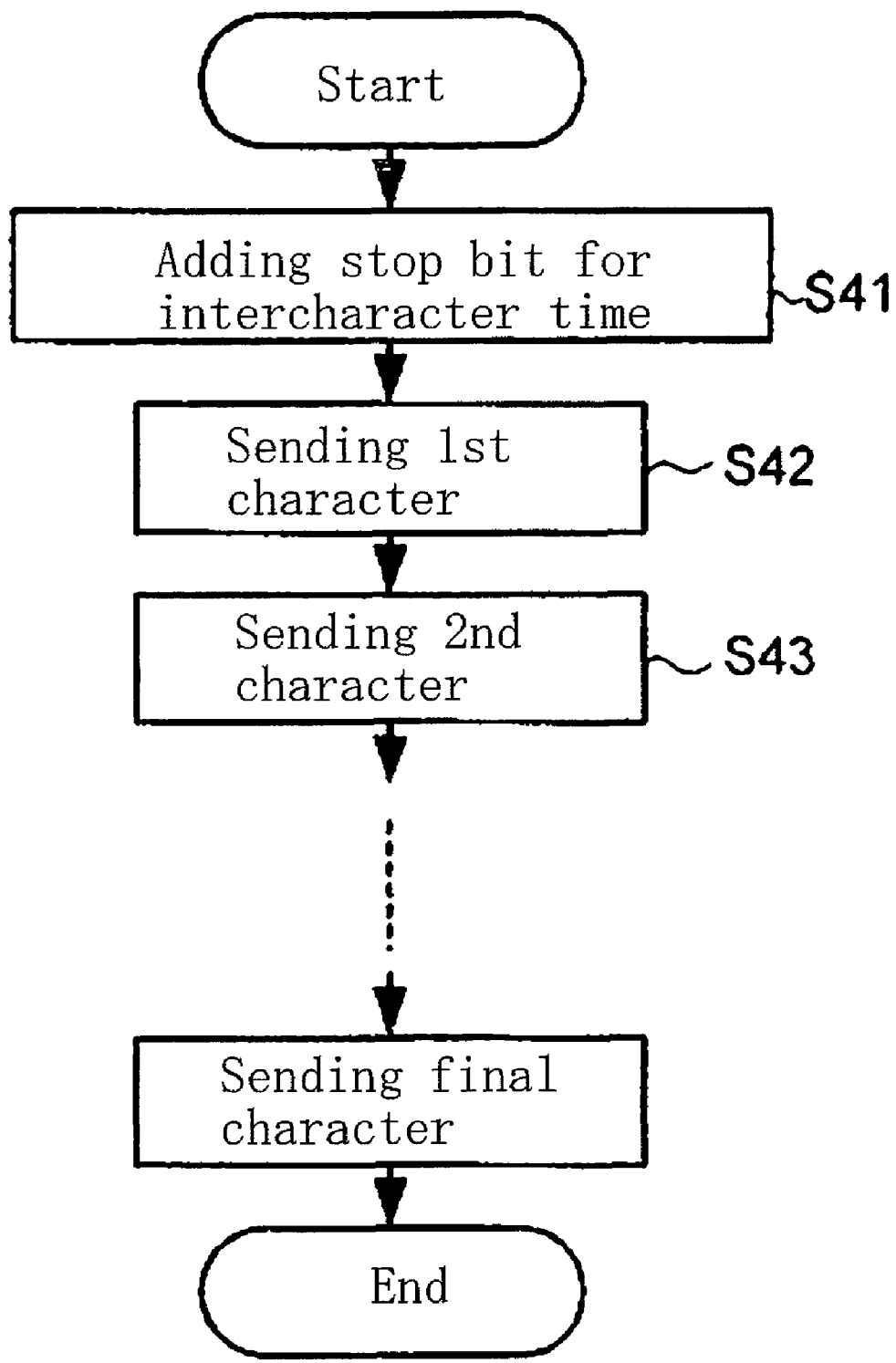

(A)

(B)

F I G. 12
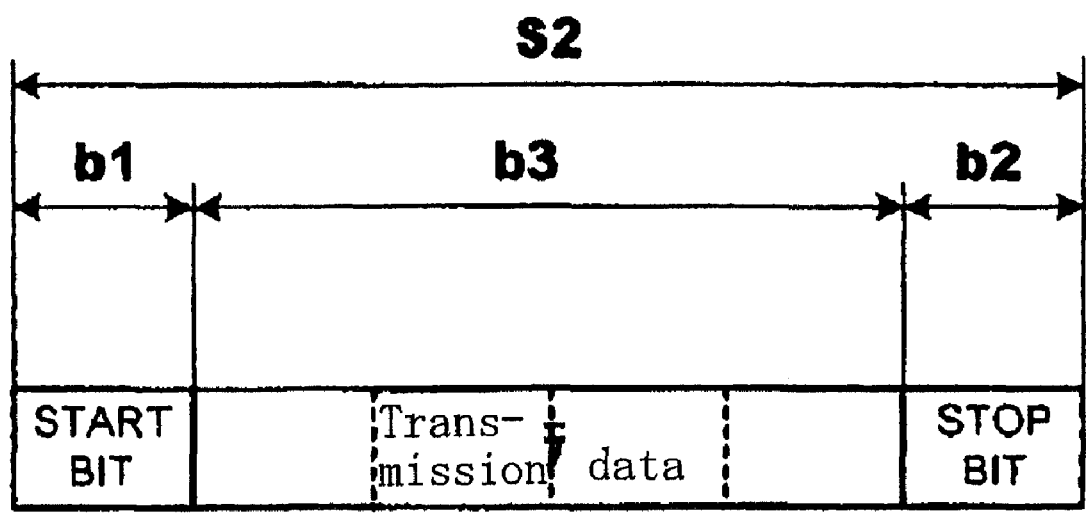

F I G. 17
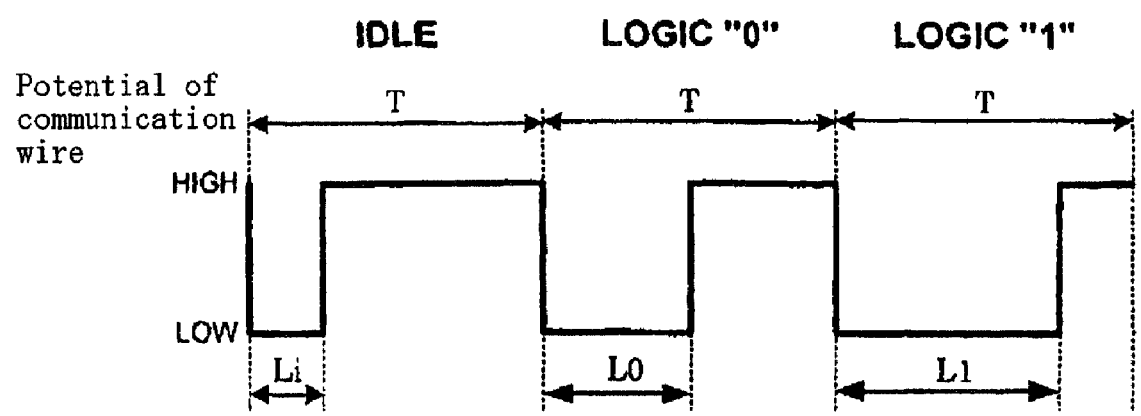

F I G. 18
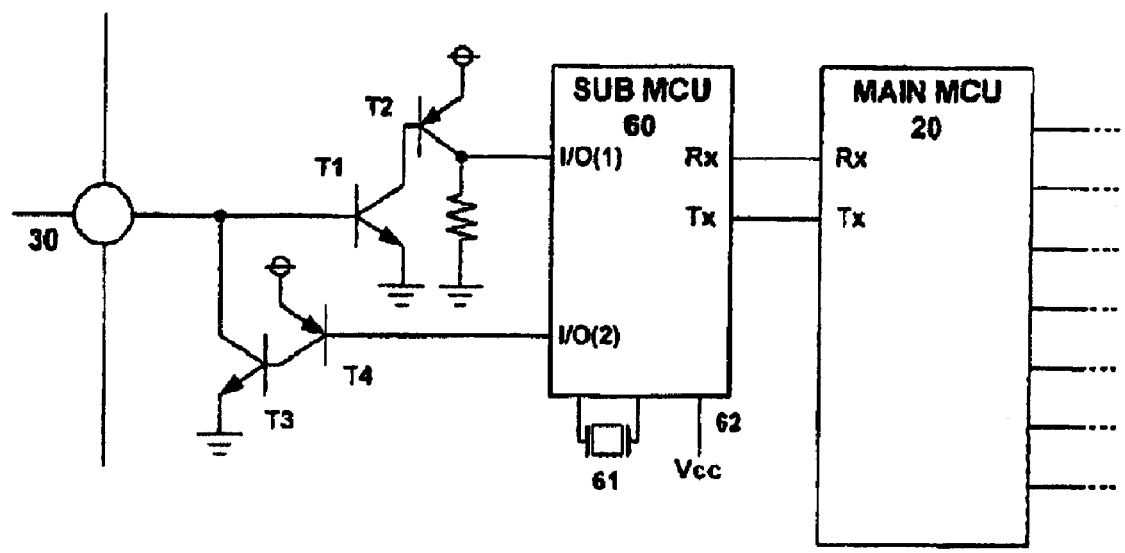

DATA TRANSCEIVING METHOD AND DATA TRANSCEIVING EQUIPMENT

BACKGROUND OF THE INVENTION

1. Field of the Invention

The present invention relates to a method for transceiving special data when data are communicated in use of serial communication interfaces, in particular to a method for transceiving special data in digital communication for vehicle, the method will be integrant technology of a future network among vehicles (IN-VEHICLE NETWORK).

2. Description of Background Art

So-called IN-VEHICLE NETWORK is a technology of linking through a network so that pieces of information in electrical components are mutually shared and the wiring in a vehicle is simplified. Exchange of information in the network is based on a digital communication method standardized for communication among vehicles. There are many cases where a digital communication method different from a general-purpose digital communication is applied and special signals and a special transceiving means are required because it is used for data communication for vehicle requiring improvement on reliability and efficiency of information exchange.

As one of digital communication standards for vehicle, Local Interconnect Network (LIN) is exemplified.

FIGS. 10A and 10B illustrate a network structure and a concept of transmission in LIN. In FIGS. 10A and 10B, data are transmitted from a master control unit to a slave control unit by a slave task in the master control unit, and the data are transmitted among slave control units by a message ID. Further, a message frame includes a synchronization field (synch field), an identifier field, a data field of 2, 4 or 8 bits, and a check field. A detailed specification of LIN is described in LIN Protocol Specification Revision 1.2.

Next, a data communication using a serial communication interface will be described. FIG. 11 illustrates a structure of one of nodes provided for data communication of IN-VEHICLE NETWORK. In FIG. 11, electrical control unit (ECU) 2 is equipped in one of electrical components 1 of vehicle, and ECU 2 includes serial communication interface (SCI) 10, and microcomputer unit (MCU) 20.

ECU 2 forms one of nodes in the IN-VEHICLE NETWORK and transceives information with other nodes by serial communication through a communication wire 30, wherein the electric potential of the communication wire 30 is changed between HIGH and LOW.

Details of transceiving the data through the serial communication interface 10 will be described in view of FIG. 11.

(1) A case where the electric potential of the communication wire is operated by a node on the others' side based on communication information, i.e. a node on the own side receives.

When the potential is HIGH, transistor T1 is turned on and transistor T2 is turned on, whereby receive port Rx of MCU20 becomes HIGH.

When the potential is LOW, transistor T1 is turned off, and transistor T2 is turned off, whereby receive port Rx of MCU20 becomes LOW.

As such, receive port Rx checks the level of HIGH or LOW of the communication wire electric potential effected by the node on the others' side.

(2) A case where the electric potential of the communication wire is operated by the node on the own side based on communication information, in other words the node on the own side receives.

When the potential is changed to HIGH, transmission port Tx is changed to HIGH. Then, transistor T4 is turned off, transistor T3 is turned off, whereby communication wire 30 becomes HIGH.

When the electric potential is changed to LOW, transmission port Tx is changed to LOW. Then transistor T4 is turned on, and transistor T3 is turned on, whereby the electric potential of the communication wire becomes LOW.

Receive port Rx of MCU20 stores continuous data of HIGH and LOW through the communication wire into a storage, e.g. resistor, provided in advance, automatically as data of 0 and 1. As illustrated in FIG. 12 in a case of Universal Asynchronous Receiver/Transmitter (hereinbelow referred to as UART), single character S2 including start bit b1, stop bit b2 and data bit b3, interposed between start bit b1 and stop bit b2, is ordinarily recognized as one unit of the communication data, and data bit b3 is ordinarily stored as received information.

Meanwhile, transmission port Tx of MCU20 automatically controls the electric potential of communication wire 30 by automatically recognizing the continuous data of HIGH or LOW in the communication wire as the data of 0 or 1 based on data prepared in the storage in advance. In UART, single character S2 is ordinarily operated as a unit of the communication data.

Conventional Technique 1

When UART is carried out based on a predetermined transmission rate using a serial communication interface, there is a case where special data including communication wire continuous dominant levels of a number of N bits more than the ordinary number of n bits of communication wire continuous dominant levels, limited by the number of transceiving bits set within a single character, i.e. a unit of communication data. Hereinbelow, a communication wire level in an initial state where a power source is thrown in the communication wire and no control is done is referred to as a communication wire recessive level, and a communication wire level in a state that the control is done is referred to as a communication wire dominant level.

For example, as illustrated in FIG. 12, a case where a single character is composed of start bit b1 of one bit, stop bit b2 of one bit, and data bit b3 of eight bits, and LOW data composed of continuous 13 bits like SYNCH BRAKE SIGNAL for informing initiation of message frame in LIN, are sent out, will be described. In this case, it is necessary to provide hardwares and a software to be described below.

As illustrated in FIG. 13, the hardware of I/O terminal 40 is added to MCU20 and the hardware of breaking circuit 50 is added between I/O terminal 40 and communication wire 30.

The software is a control program for I/O terminal 40 added to MCU20. FIG. 14 exemplifies a case where four characters are sent, in other words, a flow chart for transmitting the whole characters including special data of communication wire continuous dominant levels having a first character longer than in the standard.

The data communication according to CONVENTIONAL TECHNIQUE 1 will be described in reference of FIG. 15. At point A, the potential of communication wire 30 is set to be LOW in use of I/O port 40 specially provided in MCU20 and special breaking circuit 50 which is not inherently provided in SCI circuit 10. Next, in time period B, the state of LOW in communication wire 30 is maintained for a time duration realizing "communication frame start signal S1" by measuring a time by a timer in MCU20. "Communication frame start signal S1" is for example a signal of LOW data composed of continuous 13 bits such as SYNCH BRAKE signal in LIN.

Next, at point C, the control of communication wire 30 to be LOW is released after a lapse of the time duration realizing "communication frame start signal S1".

Conventional Technique 2

In a case where UART is carried out based on a transmission rate determined using a serial communication interface, there are cases where an intercharacter time is specifically required by a receiving side because of its performance and where a message standard requires an intercharacter time between characters. An example of the case where the message standard requires the intercharacter time is RESPONSE SPACE SIGNAL in LIN illustrated in FIGS. 10A and 10B.

In this case, it is necessary to add a program for setting the intercharacter time between transmissions of character as illustrated in FIG. 16.

Data communication according to CONVENTIONAL TECHNIQUE 2 will be described in reference of FIG. 15.

At point C, the time duration realizing "communication frame start signal S1" is completed, the control of communication wire 30 to be LOW is released, and a measurement of intercharacter time S3 is started.

Next, at time period D, because a character is not immediately transmitted in UART, intercharacter time S3, i.e. a time duration corresponding to one bit in FIG. 15, is measured by a timer function of MCU20.

Next, at point E, after intercharacter time S3 passes over, character data S2 byte-corded for asynchronous method are sent. In this example, character data S2 is transmitted to MCU20 in a setting of a normal transmission rate, the start bit of 1 bit, the data bit of 8 bits, and the stop bit of 1 bit.

Next, at point F, after the character is completely transmitted, a measurement of intercharacter time S3 is started without transmitting a next character. The next character data is on standby.

Next, in time period G, intercharacter time S3 corresponding to a time of 1 bit is measured by the timer function of MCU20.

Next, at point H, after it is checked that intercharacter time S3 is completely measured, character data S2 byte-coded by an asynchronous method is transmitted.

Next, at point I, after the final character data is completely transmitted, a measurement of intercharacter time S3 is started without giving a sign for starting a next communication frame.

Next, in time period J, intercharacter time S3 corresponding to a time of one bit is measured by the timer function of MCU20.

At point K, after it is checked that intercharacter time S3 is completely measured, the process is completed in a state that the next communication frame is ready to be transmitted.

Conventional Technique 3

A case where data specially bit-coded by using a pulse width modulation (PWM) signal is communicated through the above-mentioned serial communication interface will be described.

FIG. 17 explains the PWM bit coding. In the PWM bit coding, for example, "IDLE", logic "0", and logic "1" are respectively expressed by the lengths Li, L0 and L1 of LOW time duration in one cycle T of PWM pulses.

FIG. 18 illustrates a conventional hardware structure for communicating the data bit-coded using the PWM signal through the serial communication interface. In FIG. 18, numerical reference SUBMCU60 designates an auxiliary microcomputer unit for communicating the PWM bit-coded data. In SUBMCU60, a program for communicating the data is installed. I/O (1) port in SUBMCU60 is provided so that the time duration of the potential of LOW in the communication wire is monitored, measured, and inputted. I/O (2) port in SUBMCU60 is provided so that the time duration of the potential of LOW in the communication wire is monitored, measured, and outputted to make the potential to be LOW. Rx port and Tx port in SUBMCU60 are respectively connected to Rx port and Tx port in MAINMCU20 so that data is communicated in serial between SUBMCU60 and MAINMCU20. Further, oscillator 61 for driving SUBMCU and power supply wire 62 for supplying power to SUBMCU are connected to SUBMCU60.

A method for communicating the specially bit-coded data using the PWM signal by the hardware illustrated in FIG. 18 will be described.

A case where the hardware in FIG. 18 is used as a node on the sending side will be described at first.

(1) Sending an Idle Pulse

I/O (2) port as a switch for operating the circuit making the potential of the communication wire LOW is switched on to be in an output state. Simultaneously, the time duration of one cycle of pulse is started to be measured. After a lapse of the time rate of LOW in one cycle of pulse realizing IDLE pulse, the I/O port is switched off to be in a non-output state. After a lapse of one cycle of pulse, a single IDLE pulse is completely transmitted and the following pulse generation control flow will be performed.

(2) Sending a Pulse Meaning Logic "0"

I/O (2) port as a switch for operating a circuit for making the communication wire potential LOW is switched on to be in an output state. Simultaneously, the time duration of one period of pulse is started to be measured. After a lapse of the time rate of LOW in one cycle of pulse realizing logic "0", the I/O port is switched off to be in a non-output state. After a lapse of one cycle of pulse, a single bit pulse is completely transmitted and the following pulse generation control flow will be performed.

(3) SENDING A PULSE MEANING LOGIC "1"

I/O (2) port as a switch for operating a circuit for making the communication wire potential LOW is switched on to be in an output state. Simultaneously, the time rate of one cycle of pulse is started to be measured.

After a lapse of the time rate of LOW in one cycle of pulse meaning logic "1", the I/O port is switched off to be in a non-output state. After a lapse of one cycle of pulse, a single bit pulse is completely transmitted and the following pulse generation control flow will be performed.

Next, a case where the hardware in FIG. 18 is used as a node on the receiving side will be described.

(1) Detecting an event that the communication wire potential is transferred from HIGH to LOW, and simultaneously it is started to measure the time duration;

(2) Detecting an event that the communication wire potential is transferred from LOW to HIGH, and simultaneously the measured time duration is checked. The measured time duration is stored in a memory as the time duration of LOW in one pulse;

(3) Detecting an event that the communication wire potential is transferred from HIGH to LOW, and simultaneously the measured time duration is checked, and the measurement is initialized by resetting. The measured time duration is stored in a memory as the cycle of one pulse, and simultaneously the above (1) is performed;

(4) The time rate of LOW in one in the cycle of pulse is calculated from the stored data. Based on the result, the measured pulses are classified by their meaning among "IDLE", "0", and "1", and the measured pulses are sequentially stored in a storage as data.

According to the CONVENTIONAL TECHNIQUE 1, it is necessary to specially add breaking circuit 50 in addition to SCI circuit 10, whereby an additional cost for components of the breaking circuit, a cost for mounting the components, and an area for the added circuit on a unit board are caused, and there is a case where a unit is large-sized.

Further, it is necessary to add I/O terminal 40 to MCU20, and if MCU20 does not have any unused I/O terminal, it is necessary to upgrade the number of I/O terminals in MCU. This upgrading means an increment of cost, and there is a case where a type of MCU is replaced to radically change a software and a hardware and to increase the size.

Further, by adding the I/O terminal control program for monitoring using the timer by MCU20, it is necessary to upgrade MCU when the memory capacity for program in MCU20 is not left. Further, when the turnover rate of the total program exceeds 100%, i.e. overflowing, by the additional program, it is necessary to upgrade the clock speed of MCU or MCU itself.

In other words, the above-mentioned problems of the CONVENTIONAL TECHNIQUE 1 are disadvantageous in terms of the cost and the size which are making these products nifty.

According to the CONVENTIONAL TECHNIQUE 2, it is necessary to introduce a complicated program for measuring the duration of intercharacter time and making character data to be succeedingly sent on standby. When a program memory area is not left in MCU, it is necessary to upgrade MCU.

Further, when the turnover rate of the total program exceeds 100%, i.e. overflowing, by the added program, it is necessary to upgrade the clock speed of MCU or MCU itself. These upgrading make the cost of product high.

According to CONVENTIONAL TECHNIQUE 3, it is necessary to add SUBMCU exclusively used for communication or a special IC exclusively used for communication must be added, and also wiring for supplying electric power and an oscillator for driving these must be added. It is also necessary to add a new program for SUBMCU, and a new program is necessary for communication between MAIN-MCU and SUBMCU. Therefore, the cost and the size of the product are drastically increased.

SUMMARY OF THE INVENTION

It is an object of the present invention to solve the above-mentioned problems inherent in CONVENTIONAL TECHNIQUES and to provide a data transceiving method and a data transceiving equipment which can easily transmit a special data including continuous same levels of more than the transceiving bit number, originally set in a character as a unit of communication data, at a low cost without adding a breaking circuit of the communication signal, and an I/O terminal in MCU, and an I/O terminal control program for monitoring by means of timer.

Another object of the present invention is that when an intercharacter time is required to provided between characters, which are a unit of communication data, it is unnecessary to measure a time duration by a program in MCU for providing the intercharacter time and restricts a time for sending out a next character, whereby the special data is easily transmitted at a low cost.

Another object of the present invention is to unnecessitate to add SUBMCU exclusively used for communication and a special IC exclusively used for communication and to easily transmit data bit-coded by PWM using a general-purpose serial communication interface when the data bit-coded by PWM is sent or received using the serial communication interface.

According to a first aspect of the present invention, there is provided a method for transmitting communication data at a predetermined transmission rate by UART, wherein only when a special data having a bit number of N more than a transceiving bit number of n, set in a character as one unit of the data, is sent the predetermined transmission rate is changed to n/N times the transmission rate, whereby it becomes unnecessary to add the breaking circuit of a communication signal, the I/O terminal in MCU, and the I/O terminal control program for monitoring by means of timer, described in CONVENTIONAL TECHNIQUE 1, and the above special data can be easily transmitted at a low cost.

According to a second aspect of the present invention, there is provided the method for transmitting the communication data according to the first aspect of the invention, wherein the special data is fabricated by communication wire continuous dominant levels of a number of N more than the transceiving bit number of n of communication wire continuous dominant levels, set in a character as one unit of the communication data, where, in this specification, a level of the communication wire under a state that no control is performed after throwing a power source in the communication wire is referred to as a communication wire recessive level, and a level of the communication wire under a state that the communication wire is controlled to be in a dominant level is referred to as a communication wire dominant level. The effects described in the first aspect of the present invention are obtainable in accordance with the second aspect of the invention.

According to a third aspect of the present invention, there is provided a device for transmitting communication data (ECU) including a data control unit (MCU) for transmitting the data at a predetermined transmission rate by UART and a serial communication interface (SCI) for transmitting the data from the data control unit (MCU) to a communication wire, wherein only when a special data having a bit number of N more than a transceiving bit number of n, set in a character as one unit of the data is sent, the predetermined transmission rate is changed to n/N times the transmission rate, whereby the effects described in the first aspect of the invention are obtainable in accordance with the third aspect of the invention.

According to a fourth aspect of the present invention, there is provided the device for transmitting the communication data according to the third aspect of the invention, wherein the special data is fabricated by communication wire continuous dominant levels of a number of N more than the transceiving bit number of n of communication wire continuous dominant levels, set in the character as one unit of the data, whereby the effects described in the first aspect are obtainable in accordance with the fourth aspect of the present invention.

According to a fifth aspect of the present invention, there is provided a method for transmitting communication data at a predetermined transmission rate by UART, wherein when an intercharacter time is required between characters, which are one unit of the data, the data are transmitted after adding the bit number satisfying the intercharacter time to the stop bit number in the characters defined on a transceiving side, whereby it becomes unnecessary to measure a time duration for providing the intercharacter time by a program in MCU and restrict a time of sending a next character as described in CONVENTIONAL TECHNIQUE 2, and the above-mentioned data can be easily transmitted at a low cost.

According to a sixth aspect of the present invention, there is provided a method for transmitting the communication data according to the fifth aspect of the invention, wherein the intercharacter time between the characters is a time duration of a communication wire recessive level, whereby the effects of the fifth aspect are obtainable in accordance with the sixth aspect of the invention.

According to a seventh aspect of the present invention, there is provided a device for transmitting communication data (ECU) including a data control unit (MCU) for transmitting the data at a predetermined transmission rate by UART and a serial communication interface (SCI) for sending the data from the data control unit (MCU) to a communication wire, wherein when an intercharacter time is required between characters, which are one unit of the data, the data are transmitted after adding the bit number satisfying the intercharacter time to the stop bit number in the characters defined on a transceiving side, whereby the effects of the fifth aspect of the invention are obtainable in accordance with the seventh aspect of the invention.

According to an eighth aspect of the present invention, there is provided the device for transmitting the communication data according to the seventh aspect of the invention, wherein the intercharacter time between the characters is a time duration of a communication wire recessive level, whereby the effects of the fifth aspect are obtainable in accordance with the eighth aspect of the invention.

According to a ninth aspect of the present invention, there is provided a method for transmitting communication data specially bit-coded using a pulse width modulation signal (PWM signal) through a serial communication interface, wherein the data are byte-coded by an asynchronous method in compliance with the PWM signal and transmitted, whereby it becomes unnecessary to add SUBMCU exclusively used for communication and a special IC exclusively used for communication, and the data bit-coded by the PWM signal are easily transceived using a general-purpose serial communication interface.

According to a tenth aspect of the present invention, there is provided the method for transmitting the communication data according to the ninth aspect of the invention, wherein one character of the data coded by the asynchronous method corresponds to one cycle of the data coded by PWM, LOW or HIGH in one cycle of the data coded by PWM is expressed by a ratio of LOW or HIGH levels in the one character, and a signal of "IDLE", "0", or "1" is transmitted, whereby the effects of the ninth aspect of the present invention are obtainable in accordance with the tenth aspect of the invention.

According to an eleventh aspect of the present invention, there is provided a method for receiving communication data specially bit-coded by a pulse width modulation signal (PWM signal) through a serial communication interface, wherein the data are bit-coded by a Non Return to Zero (NRZ) method and received, and the received NRZ signal is converted to the PWM signal corresponding thereto, whereby the effects of the ninth aspect of the present invention are obtainable in accordance with the eleventh aspect of the invention.

According to a twelfth aspect of the present invention, there is provided the method for receiving the communication data according to the eleventh aspect of the invention, wherein LOW or HIGH in one cycle of the data coded by the PWM signal is received as one unit of the data coded by the NRZ method and having a plurality of bits, and the one unit of the data coded by the NRZ method is replaced by the corresponding data coded by the PWM signal, whereby the effects of the ninth aspect are obtainable in accordance with the twelfth aspect of the invention.

According to a thirteenth aspect of the present invention, there is provided a device for transmitting communication data (ECU) including a data control unit (MCU) for transmitting the data at a predetermined transmission rate by UART and a serial communication interface (SCI) for transmitting the data from the data control unit to a communication wire, wherein a data specially byte-coded by a pulse width modulation signal (PWM signal) is bit-coded by an asynchronous method so as to correspond with the data specially bit-coded by the PWM signal and transmitted, whereby the effects of the ninth aspect are obtainable in accordance with the thirteenth aspect of the invention.

According to a fourteenth aspect of the present invention, there is provided a device for receiving communication data (ECU) including a data control unit (MCU) for receiving the data at a predetermined transmission rate by UART and a serial communication interface (SCI) for transmitting the data from a communication wire to the data control unit, wherein a data specially bit-coded by a pulse width modulation signal (PWM signal) is bit-coded by a Non Return to Zero (NRZ) method and received, and the received NRZ signal is converted to the PWM signal corresponding to the received NRZ signal, whereby the effect of the ninth aspect of the present invention is obtainable in accordance with the fourteenth aspect of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a flow chart of transmission of characters according to EMBODIMENT 2 of the present invention;

FIG. 12 illustrates a configuration of character as one unit of communication data in UART;

FIG. 17 illustrates bit coding by PWM; and

FIG. 18 illustrates a hardware structure for communicating data bit-coded by PWM through a serial communication interface.

DETAILED DESCRIPTION OF THE PREFERRED EMBODIMENTS

A detailed explanation will be given of preferred embodiments of the present invention in reference to FIGS. 1 through 18 as follows, wherein the same numerical reference are used for the same or similar portion and description of these portions is omitted.

Embodiment 1

EMBODIMENT 1 is to solve the problems in the Conventional Technique 1.

In a case where UART is performed based on a predetermined transmission rate using a serial communication interface, a special data including communication wire continuous dominant levels of a bit number of N more than the transceiving bit number of n of communication wire continuous dominant levels, set in a character as one unit of communication data is transmitted by converting to decrease the transmission rate only when a transmitting side sends the special data.

Figure 1:
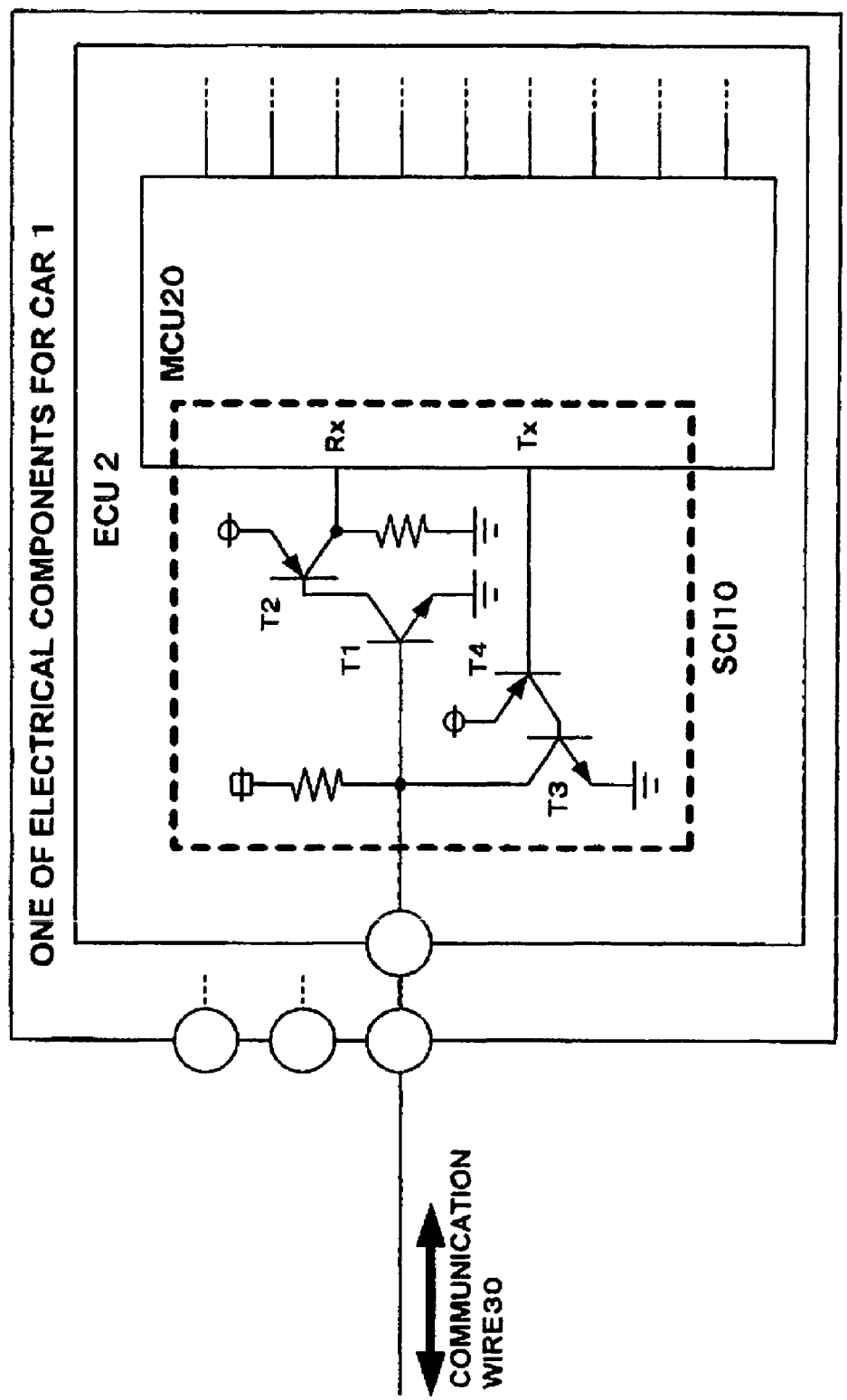
FIG. 1 illustrates a structure of one of nodes for data communication according to EMBODIMENT 1 of the present invention.

FIG. 1 illustrates a structure of one of nodes for communicating data according to EMBODIMENT 1. In FIG. 1, an electrical control unit (ECU) 2 is equipped in electrical component 1, wherein ECU 2 includes a serial communication interface (SCI) 10 and a microcomputer unit (MCU) 20.

ECU 2 is served as one of the nodes of an IN-VEHICLE NETWORK, and communicates with the other nodes in serial through communication wire 30, wherein the potential of communication wire 30 is switched over between HIGH or LOW to transceive communication information. MCU 20 has receive port Rx for receiving the information and transmission port Tx for sending the information.

Serial communication interface 10 has transistor T1 and transistor T2 which are turned on or off in response to HIGH or LOW in communication wire 30 when the communication information is received from one of the other nodes. Further, serial communication interface 10 has transistor T4 and transistor T3, which are turned on or off in response to HIGH or LOW in transmission port Tx when the information is sent out of the own node.

Figure 11:
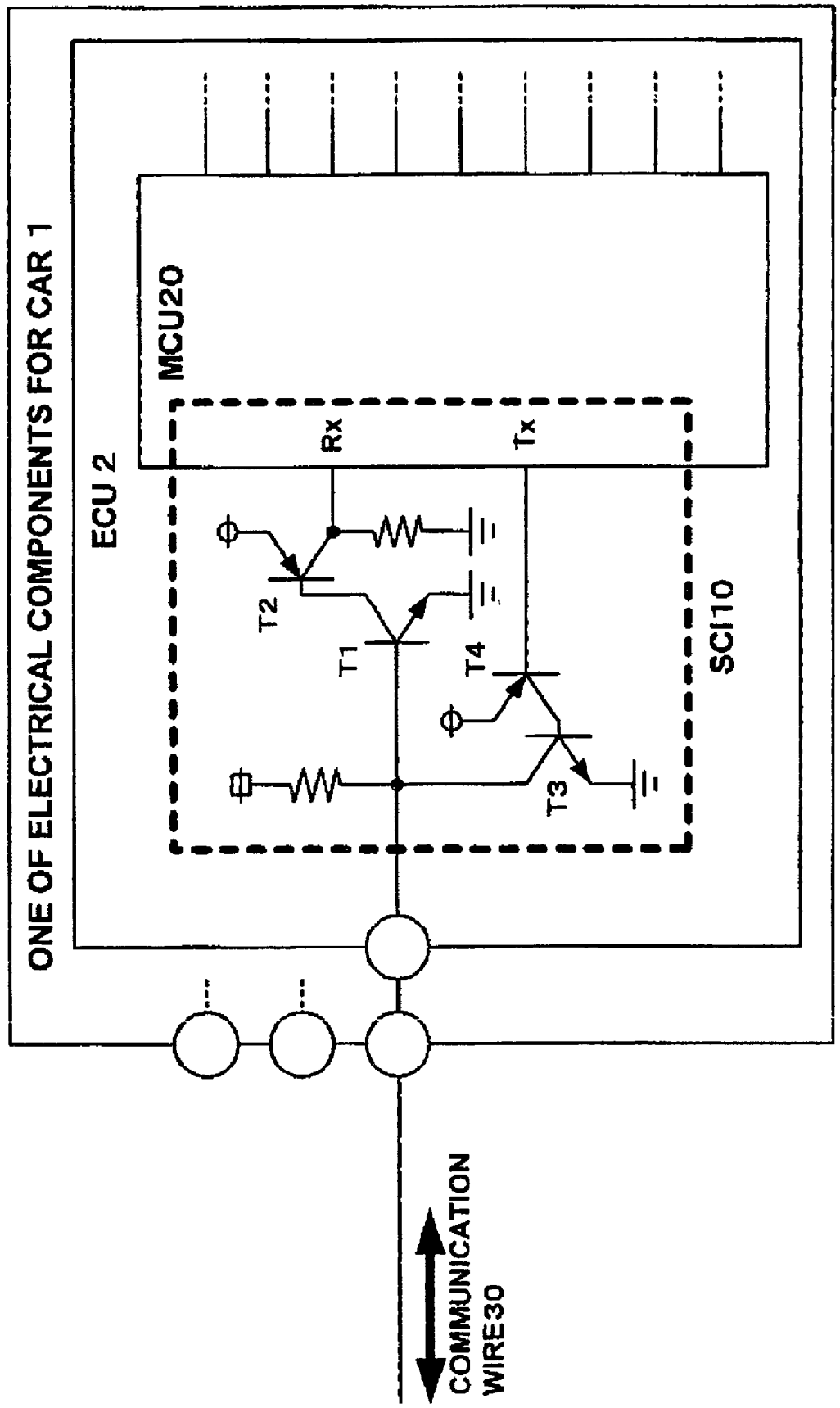
FIG. 11 illustrates a structure of one of nodes forming an IN-VEHICLE NETWORK.
Figure 13:
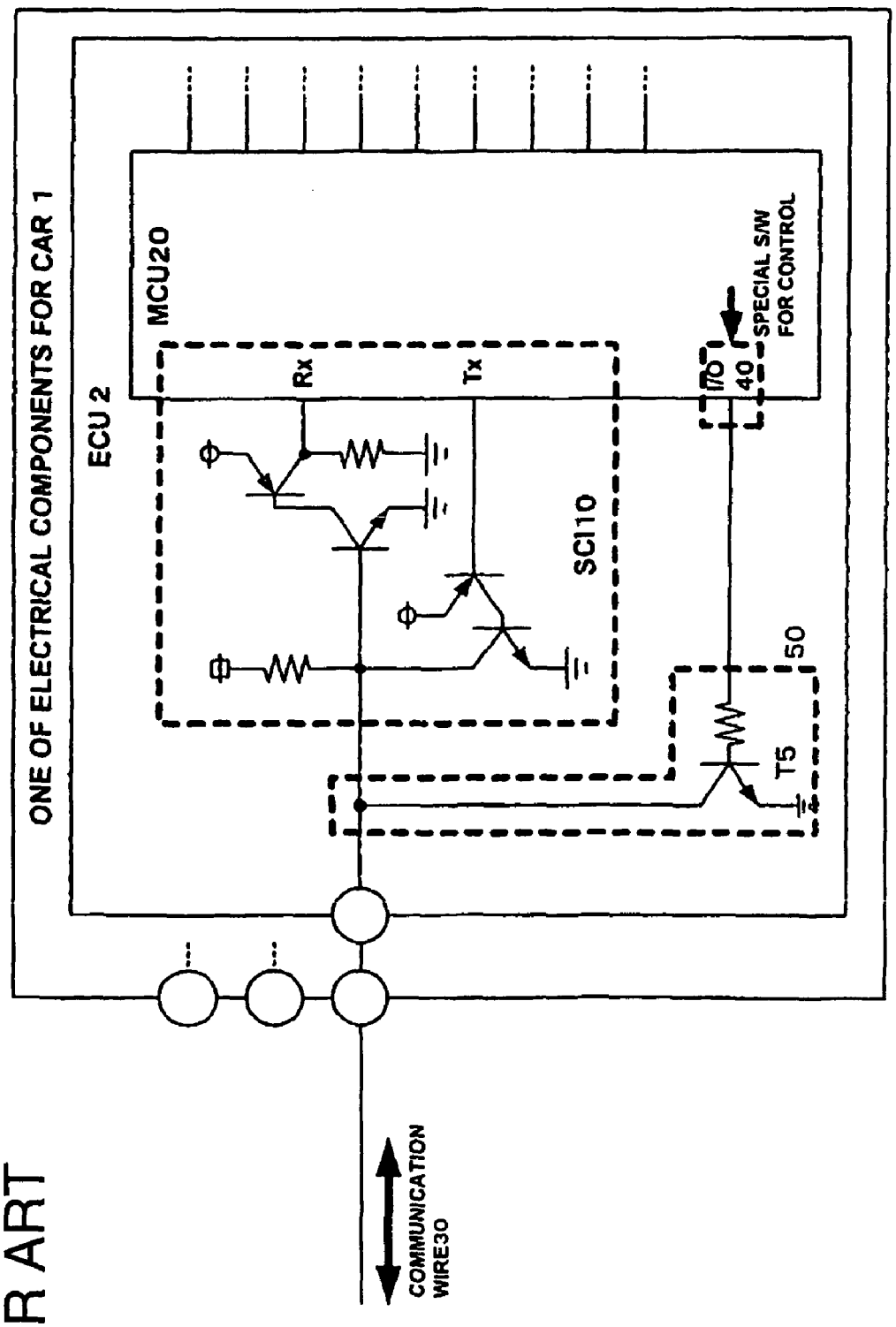
FIG. 13 illustrates a structure of a node including a serial communication interface and a breaking circuit according to CONVENTIONAL TECHNIQUE 1.
Figure 14:
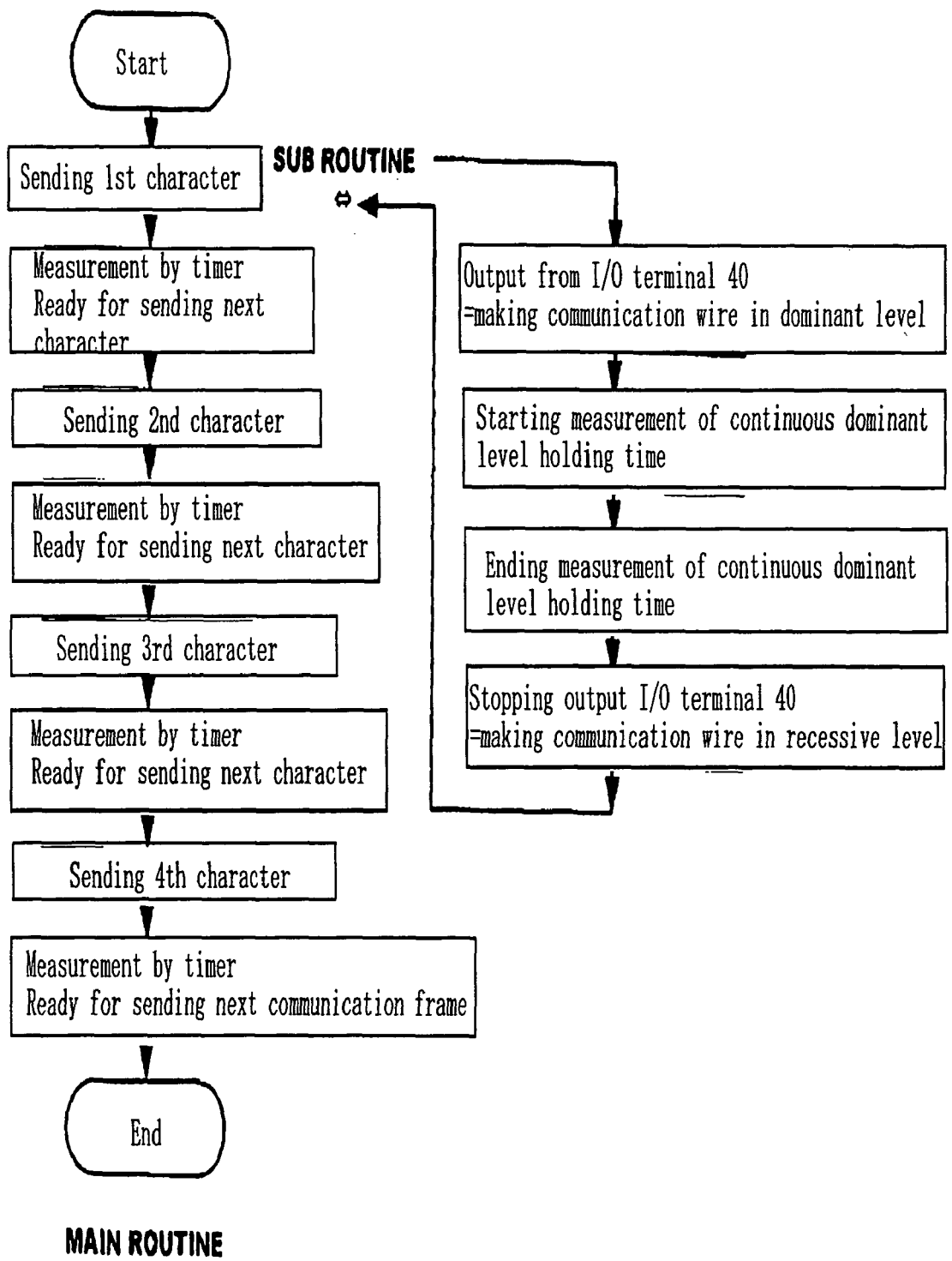
FIG. 14 is a flow chart of transmission of characters according to CONVENTIONAL TECHNIQUE 1.
Figure 15:
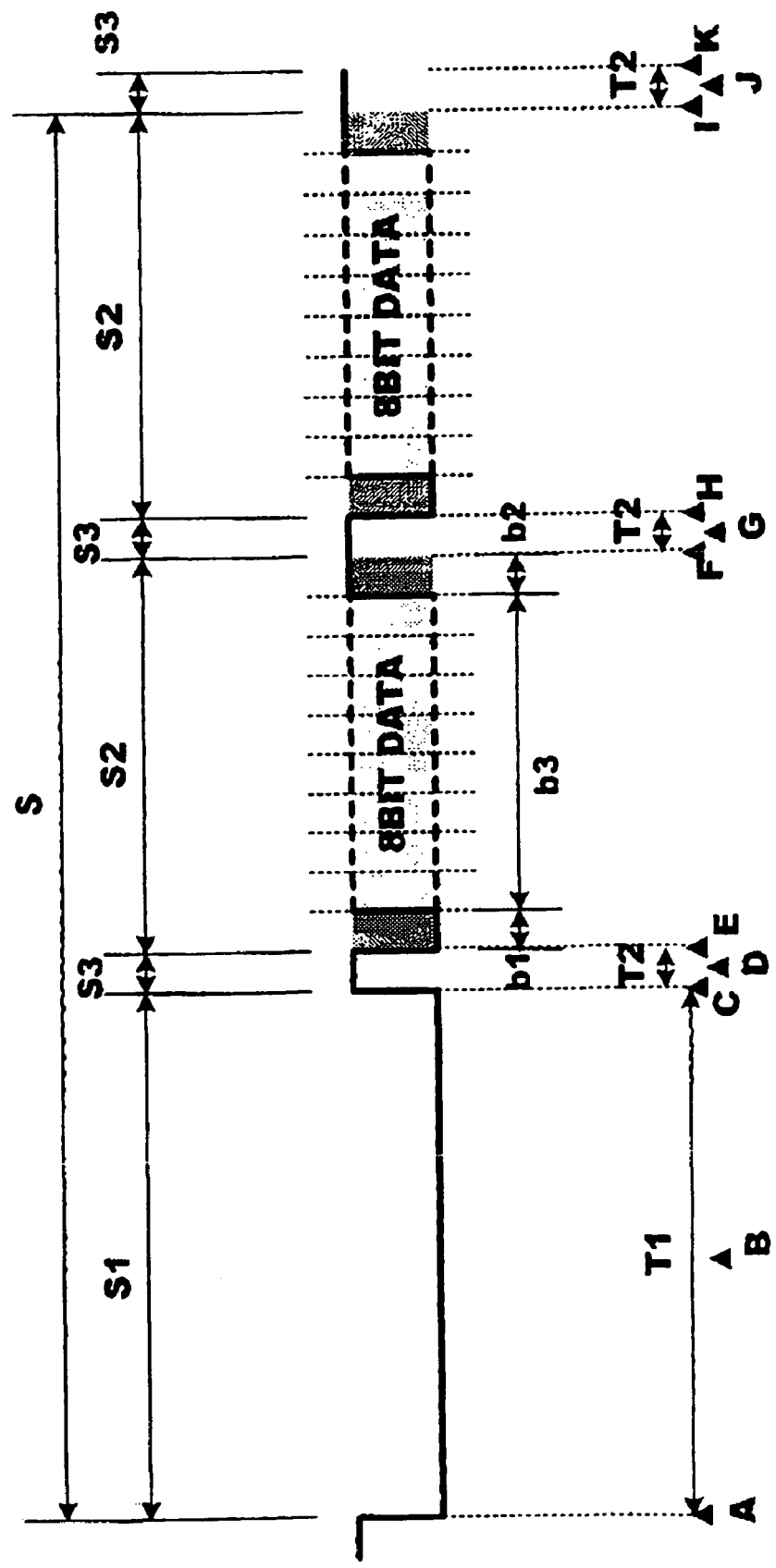
FIG. 15 schematically illustrates a signal wire for explaining serial data communication according to CONVENTIONAL TECHNIQUE 1.
Figure 16:
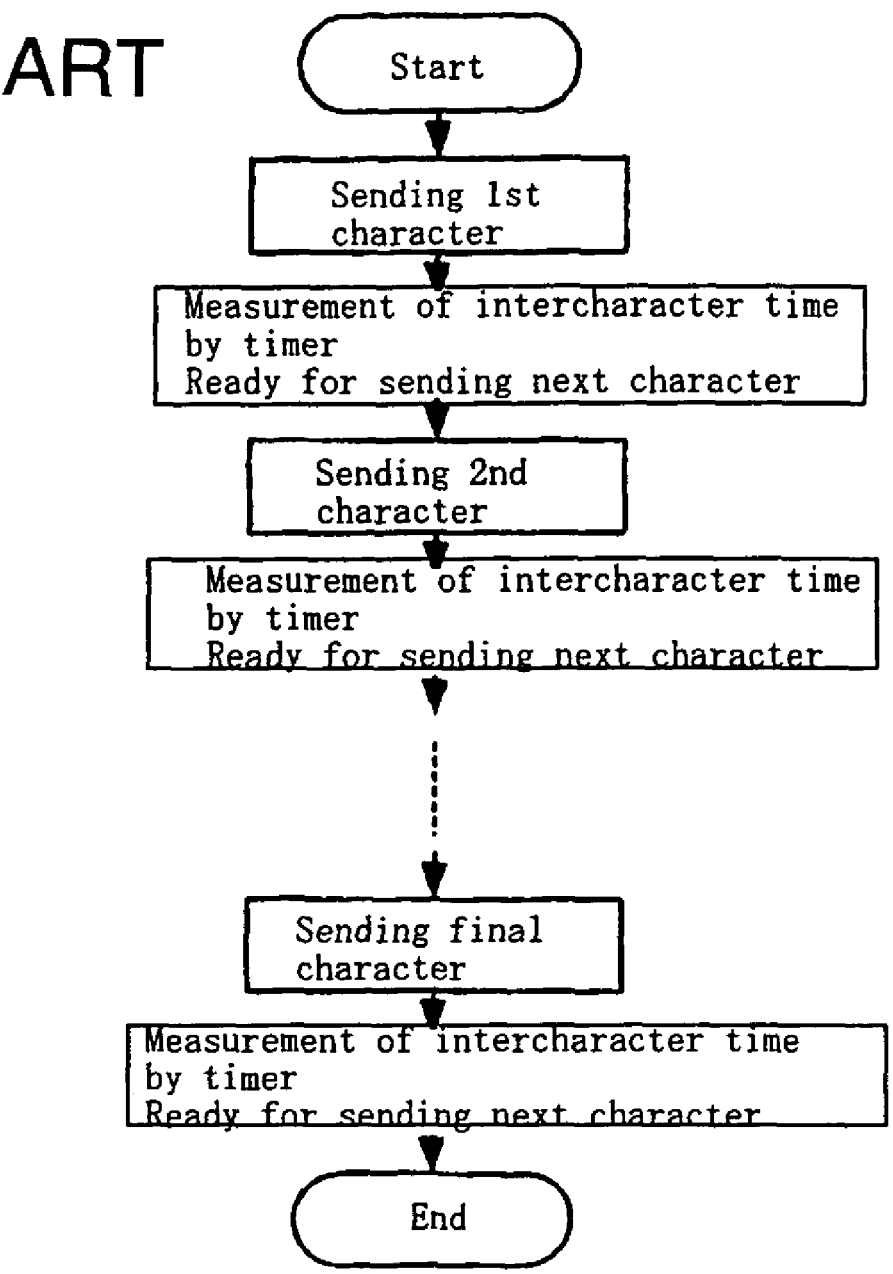
FIG. 16 is a flow chart of transmission of characters according to CONVENTIONAL TECHNIQUE 2.

As described, the hardware structure is similar to that in FIG. 11. In EMBODIMENT 1, in comparison with FIG. 13, it is unnecessary to add I/O terminal 40 to MCU 20 and breaking circuit 50 between I/O terminal 40 and communication wire 30. Thus, EMBODIMENT 1 is characterized by that there are no additional hardware.

Figure 2:
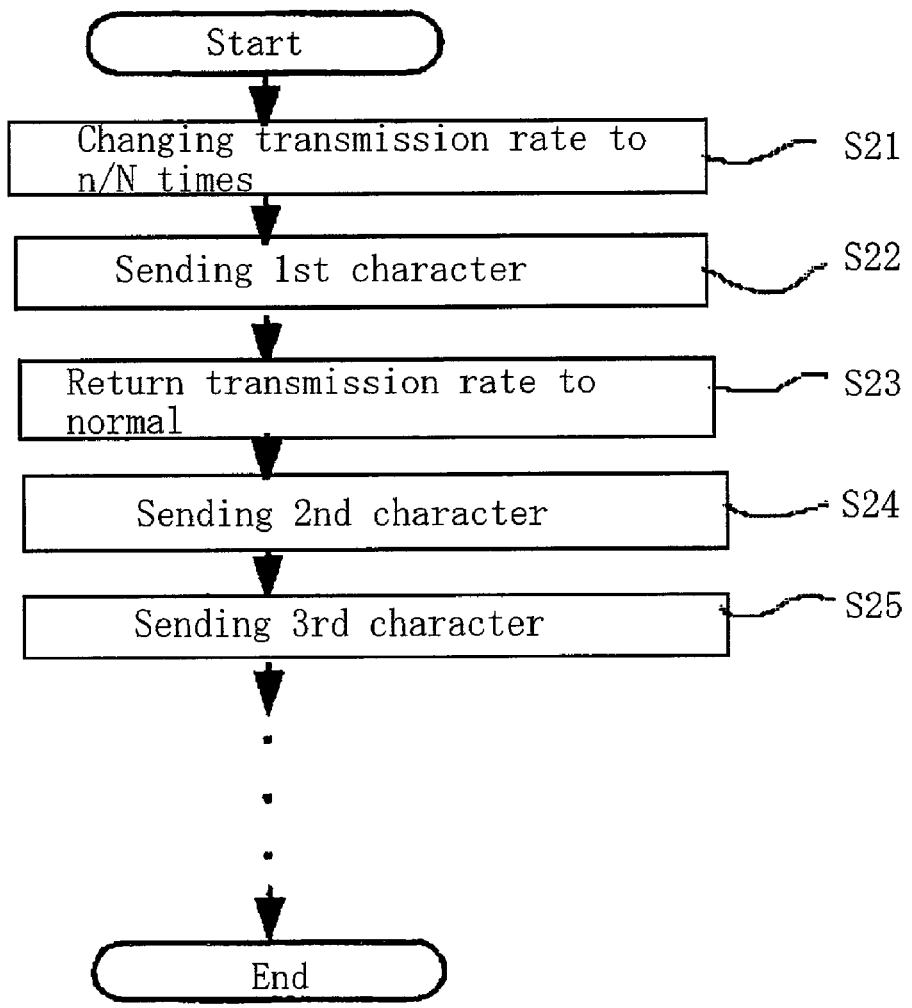
FIG. 2 is a flow chart of transmission of characters according to EMBODIMENT 1 of the present invention.

Next, a character transmitting method according to EMBODIMENT 1 will be described in reference of the flow chart of FIG. 2.

The limit bit length of communication wire continuous dominant level data according to a normal performance of serial communication of MCU 20 is represented by n, and the bit length of communication wire continuous dominant level data, i.e. special data, which is out of the normal performance is represented by N.

In Step 21, the transmission rate is changed to n/N times of the normal rate.

In Step 22, the special data being the long communication wire continuous dominant level data which can not be expressed in accordance with the normal performance of serial communication of MCU 20 is set as a first character, and the first character is sent to a node on the one of the other sides at the changed transmission rate of n/N times of the normal rate. In Step 23, after sending out the first character, the transmission rate is returned to the normal rate. Thereafter, a second character and a third character are sequentially sent out at the normal rate in Step 24 and the following steps.

As described, according to EMBODIMENT 1, when the special data having the bit number of N of the communication wire continuous dominant levels more than the transceiving bit number of n of the communication wire continuous dominant levels, set in the characters as one unit of the communication data is sent, the transmission rate is converted to decrease only in a case where the sending side sends the special data, whereby it is unnecessary to add breaking circuit 50 of communication signal, I/O terminal 40 of MCU 20, and the I/O terminal control program for monitoring by timer, which are mentioned in CONVENTIONAL TECHNIQUE 1.

According to EMBODIMENT 1, the following various problems are solved:

(1) An additional cost of adding components of a breaking circuit, a cost for equipping the components, an area occupied by the additional breaking circuit on a unit board, and possibility of increment of the size of unit;

(2) Upgrading of MCU for increasing the number of I/O terminals in a case where extra I/O terminals are not left, an increment of cost accompanied by the upgrading, a radical change of the software or the hardware possibly accompanied by a change of the type of MCU, and an increment of MCU size; and (3) When the turnover rate of the total program exceeds 100%, i.e. overflowing, by adding the program, the clock speed of MCU must be increased, or MCU itself must be upgraded.

Embodiment 2

EMBODIMENT 2 is to solve the problems of Conventional Technique 2.

In a case where asymmetrical communication is performed based on a predetermined transmission rate using a serial communication interface, a case where a receiving side requires an intercharacter time between characters because of its performance, or a case where a message standard requires an intercharacter time between characters, a sending side transmits data by switching setting of the stop bit number defined on a transceiving side by adding the number satisfying the intercharacter time.

Figure 3:
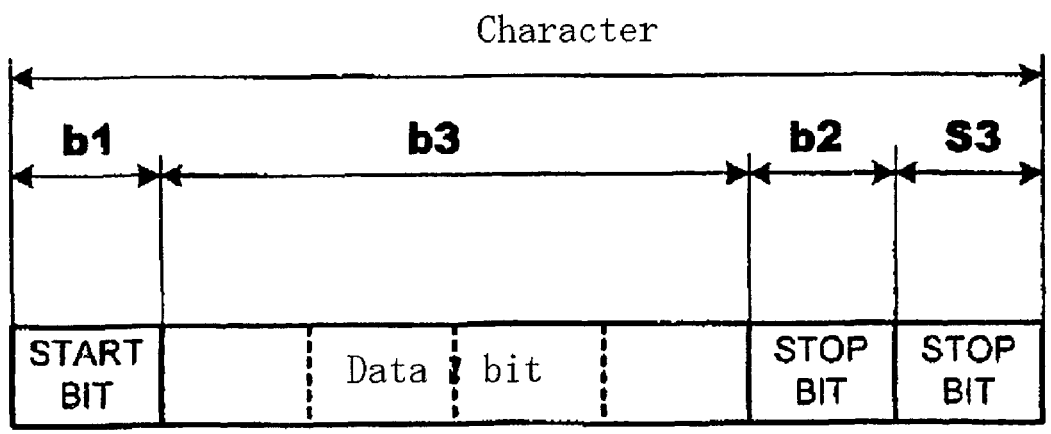
FIG. 3 illustrates a configuration of character according to EMBODIMENT 2 of the present invention.

FIG. 3 illustrates the configuration of character according to EMBODIMENT 2. In EMBODIMENT 2, the character configuration set by the sending side is inherently defined by the transceiving side, wherein stop bit S3 satisfying the intercharacter time is added to the configuration including start bit b1, data bit b3, and stop bit b2.

FIG. 4 is the flow chart illustrating character transmission according to EMBODIMENT 2. In Step 41, the sending side adds the stop bit as much as the intercharacter time to the stop bit in the character configuration inherently defined by the transceiving side.

Next, in Step 42 and the following steps, a first character and a second character, which are set to have the additional stop bit are sequentially transmitted. As described, according to EMBODIMENT 2, since the sending side sends the data by switching the setting by adding the bit number satisfying the intercharacter time to the stop bit number defined by the transceiving side, it becomes unnecessary to measure a time duration by the program of MCU for providing the intercharacter time between the transmissions of character as described in CONVENTIONAL TECHNIQUE 2, and to restrict a time for sending a next character.

According to EMBODIMENT 2, it becomes unnecessary to upgrade MCU in a case where the program memory area of MCU is not left, and to enhance the clock speed of MCU and upgrade MCU itself in a case where the turnover rate of the total program exceeds 100%, i.e. overflowing, by adding the program.

Figure 5:
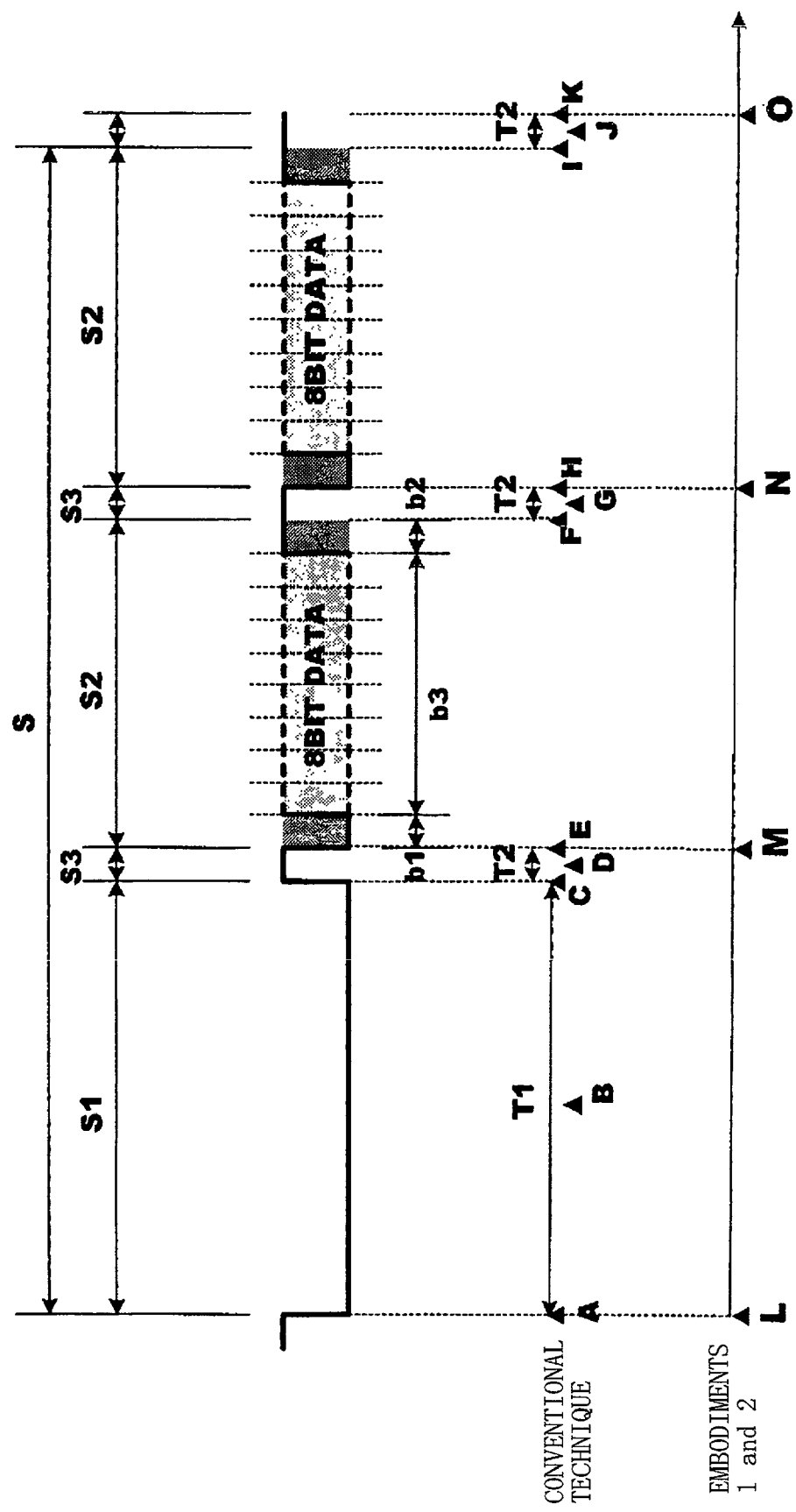
FIG. 5 schematically illustrates a signal wire for explaining data communications according to EMBODIMENTS 1 and 2.

Next, an example of the data transmission method according to EMBODIMENTS 1 and 2 will be described in reference of the schematically shown signal wire in FIG. 5. In FIG. 5, communication frame S is configured by a plurality of characters, where one character is one unit of communication data. SI designates a communication frame staring signal, wherein the signal is configured by long communication wire continuous dominant levels, which are not expressed by a standard performance of serial communication by MCU. Hereinbelow, S1 designates LOW data of a length of continuous 13 bits such as SYNCH BRAKE SIGNAL in LIN, and S2 is configured by start bit b1 of 1 bit (LOW), stop bit b2 of 1 bit (HIGH), and data bit b3 of 8 bits. In this case, the limit of length of communication wire continuous dominant levels, which can be expressed by the character, becomes 9 bits. The intercharacter time S3 is provided between transmissions of character and is a time corresponding to the length of 1 bit.

Next, the method according to EMBODIMENTS 1 and 2 will be described step by step in accordance with the schematically shown signal line in FIG. 5.

At point L, byte data "FFh" is byte-coded by the asynchronous method from communication start signal S1 of a length of continuous 13 bits, being LOW data, and sent out as the first character. In this case, a transmission rate is set to be 9/13 times of a normal rate. The character configuration is a start bit of 1 bit (LOW), a data bit of 8 bits (LOW), and a stop bit having the added intercharacter time of 2 bits (HIGH).

At point M, after sending the fist character, the second character is subjected to byte coding by an asynchronous method and sent out as a byte data. In this case, the transmission rate is returned to the normal rate. The character configuration is a start bit of 1 bit (LOW), a data bit of 8 bits, and a stop bit having the added intercharacter time of 2 bits (HIGH). Next, at point N, after sending the second character, the third character is subjected to byte coding by the asynchronous method and sent out as a byte data. In this case, the transmission rate is the normal rate. The character configuration is a start bit of 1 bit (LOW), a data bit of 8 bits, and a stop bit having the added intercharacter time of 2 bits (HIGH).

Next, at point O, after sending the final character, the process is completed in a state that a next communication frame is ready to be sent.

Embodiment 3

EMBODIMENT 3 is to solve the problems of

Conventional Technique 3.

When data are transmitted by a special bit coding using a pulse width modulation signal (PWM signal) through a serial communication interface, the data are subjected to a byte coding by an asynchronous method so as to correspond with the PWM signal. Specifically, one character of the data coded by the asynchronous method corresponds to one cycle of the data coded by PWM, signals "IDLE", "0", and "1" are sent by expressing LOW or HIGH in one cycle of the data coded by PWM in accordance with ratios of LOW levels and HIGH levels in the one character.

When the data specially bit coded by the PWM signal is received through the serial communication interface, the data is received in a form of Non Return to Zero (NRZ) signal, and the received NRZ signal is converted to a corresponding PWM signal. Specifically, LOW and HIGH in one cycle of the PWM coded data are received in a form of one unit of the data coded by the NRZ method having a plurality of bits, and the one unit of the data coded by the NRZ method is replaced by a corresponding data coded by PWM.

Figure 6:
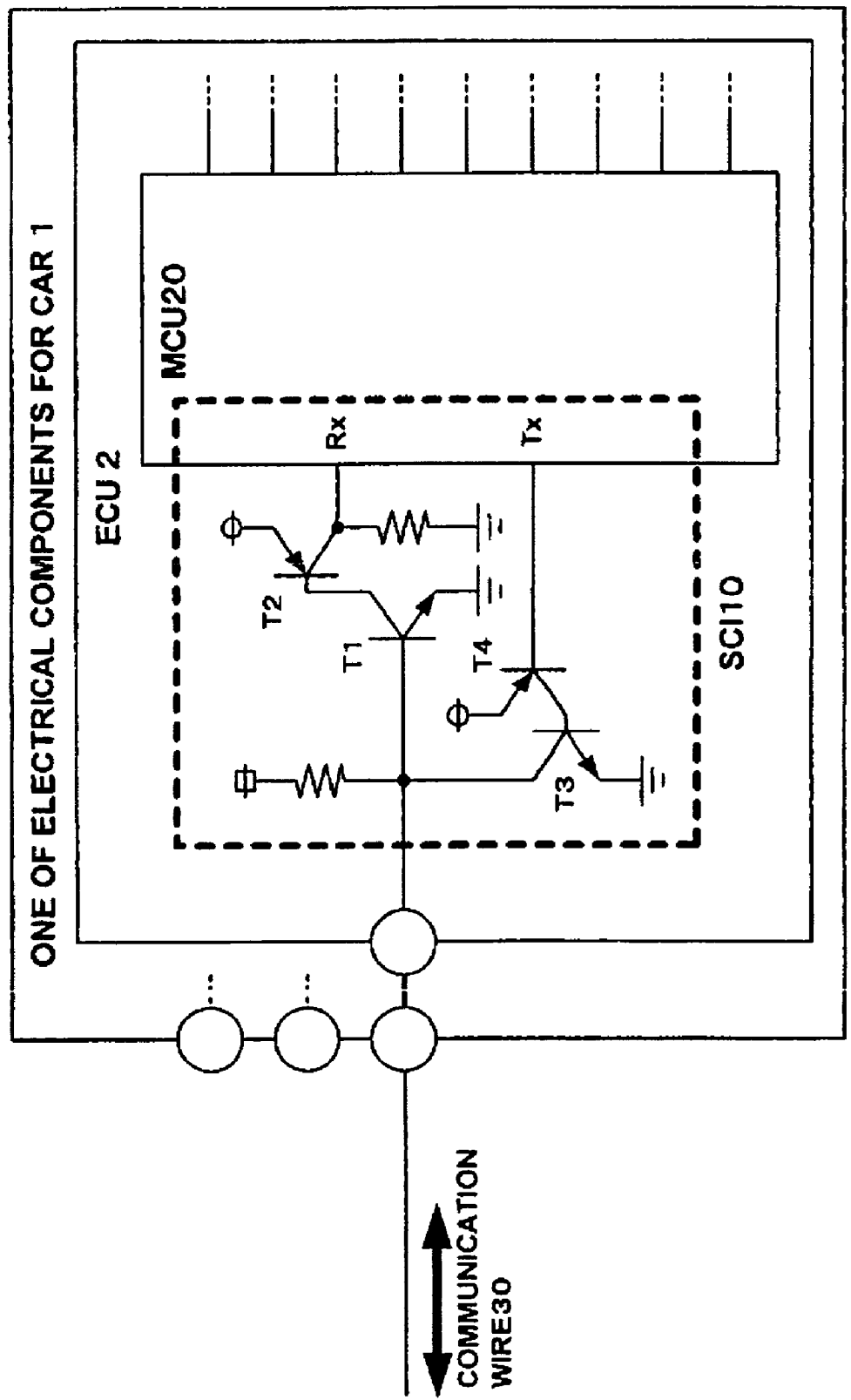
FIG. 6 illustrates an example of hardware structure for data communication according to EMBODIMENT 3.

FIG. 6 illustrates the hardware structure for receiving and sending the data bit-coded by PWM according to EMBODIMENT 3. The hardware structure in FIG. 6 includes the serial communication interface (SCI), wherein the structure is similar to that in FIG. 1.

Figure 7:
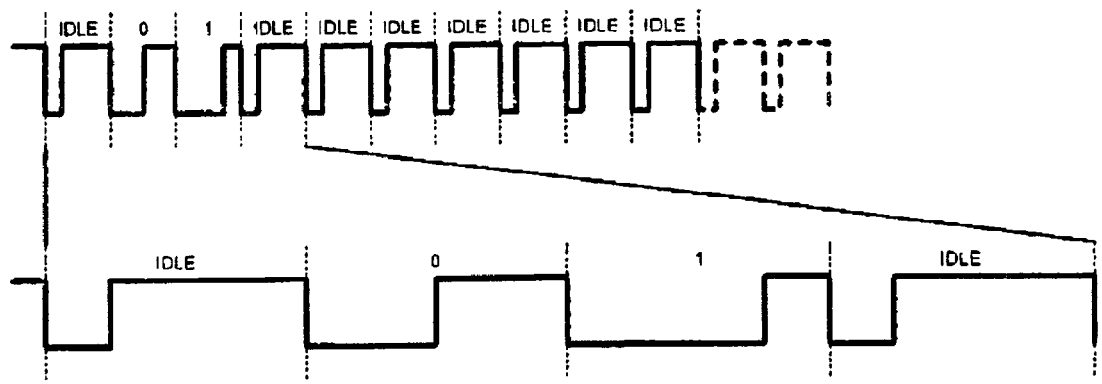
FIG. 7 illustrates a waveform of the potential in a communication wire obtained by coding by PWM.

Next, an operation of sending the data bit-coded by PWM using the hardware structure in FIG. 6 will be described in reference of FIG. 7.

Figure 8:
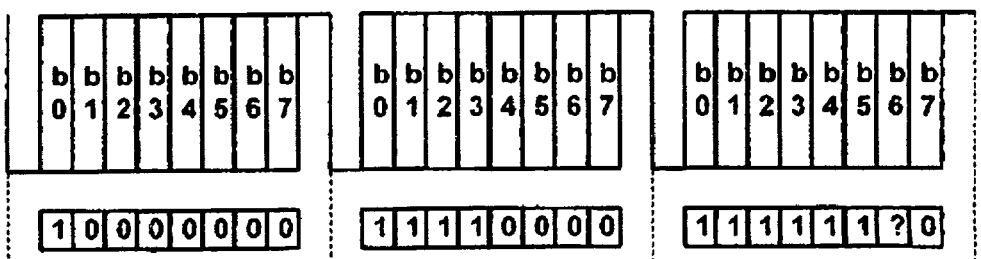
FIG. 8 schematically illustrates a signal wire for explaining a data transmission method according to EMBODIMENT 3 of the present invention.
Figure 8:
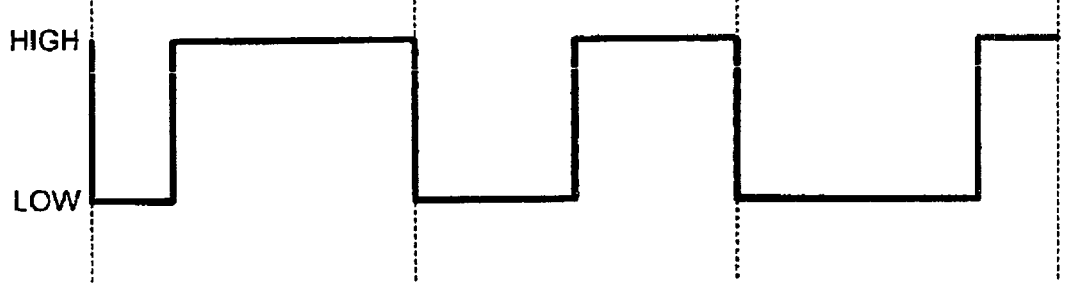

FIG. 8 is the schematically illustrated signal line, in which data subjected to the byte coding by the asynchronous method are sent out and transmitted to a communication wire as the data bit-coded by PWM.

The structure of character subjected to the byte coding by the asynchronous method to be transmitted is a start bit of 1 bit, a data bit of 8 bits, and a stop bit of 1 bit. In order to send IDLE signal bit-coded by PWM, SCI 10 is used to send "00000001b" byte-coded by the asynchronous method. In order to send logic signal "0" bit-coded by PWM, SCI 10 is used to send "00001111b" byte-coded by the asynchronous method. In order to send the logical signal "1" bit-coded by PWM, SCI10 is used to send "00111111b" byte-coded by the asynchronous method.

Figure 9:
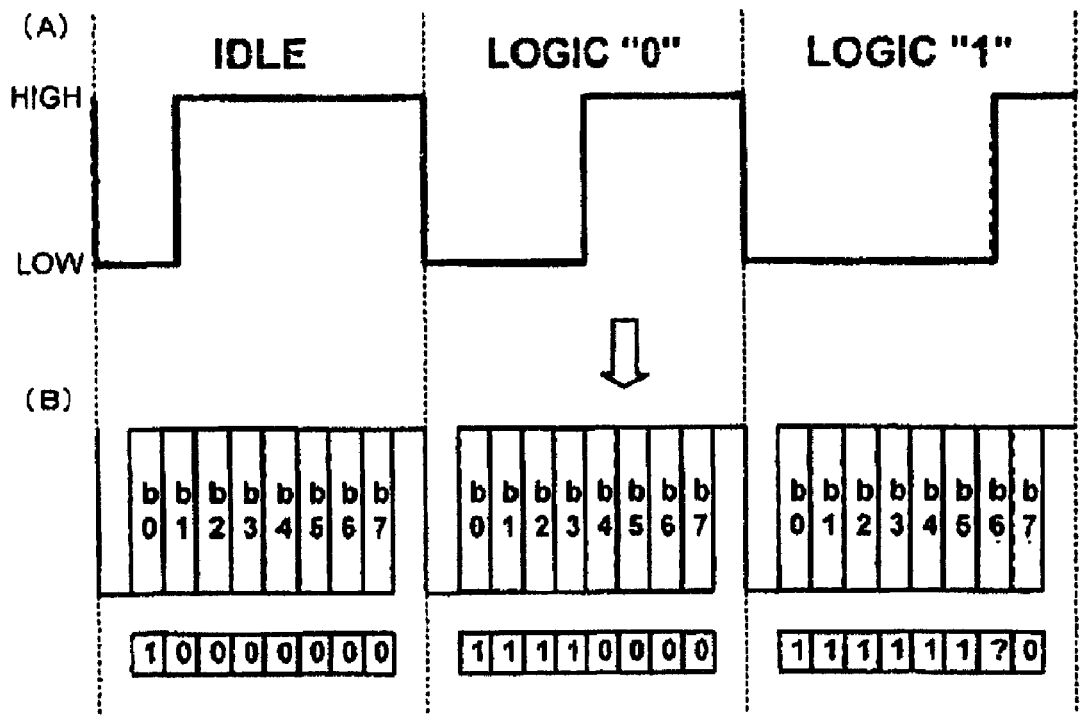
FIG. 9 schematically illustrates a signal wire for explaining a data receiving method according to EMBODIMENT 3 of the present invention.
Figure 10:
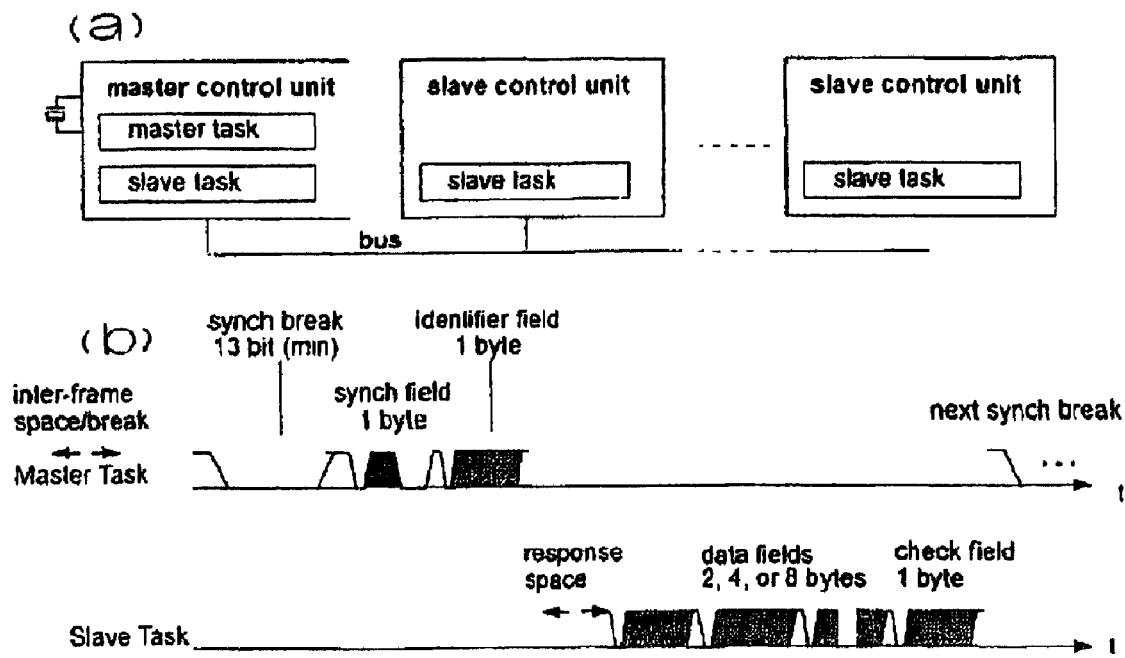
FIGS. 10A and 10B illustrate network structure of LIN and the communication concept therof.

Next, an operation of receiving the data bit-coded by PWM in FIG. 7 using the hardware structure in FIG. 6 will be described. FIG. 9 is the schematically illustrated signal wire for explaining that the data coded by PWM is received and taken in a form of data bitcoded by NRZ. When NRZ byte code "00000001b", byte-coded by the asynchronous method is received in use of SCI10, MCU20 recognizes it as IDLE pulse and sequentially store this as data in a storage.

Meanwhile, when NRZ byte code "00001111b", byte-coded by the asynchronous method is received, MCU20 recognizes it as logic "0" and sequentially stores this as data in the storage.

Further, when NRZ byte code "00111111b" or "01111111b", byte-coded by the asynchronous method is received, MCU20 recognizes it as logic "1" and sequentially stores this as data in the storage.

As described, according to EMBODIMENT 3, since the data specially bit coded using the PWM signal are easily send or received through the serial communication interface, it becomes unnecessary to add SUBMCU exclusively used for communication and the special IC exclusively used for communication, described in CONVENTIONAL TECHNIQUE 3. Further, it becomes unnecessary to add a power supply wire and an oscillator for driving therefore. Further, it becomes unnecessary to design a program for SUBMCU and provide a program for communication between MAINMCU and SUBMCU.

A special data including the bit number of N of communication wire continuous dominant levels more than the transceiving bit number of n of communication wire continuous dominant levels, set in a character as one unit of communication data, can be transceived by a widely-used serial communication interface such that a predetermined transmission rate is changed to n/N times of it only when the special data is transmitted, whereby such a special data can be easily transceived at a low cost.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2001-109751 filed on Apr. 9, 2001 including specification, claims, drawings and summary are incorporated herein by reference in its entirety.

What is claimed is:

1. A method for transmitting communication data at a predetermined transmission rate by Universal Asynchronous Receiver/Transmitter (UART), the method comprising: only when a special data having a bit number of N more than a transceiving bit number of n, set in a character as one unit of the data, is sent, changing the predetermined transmission rate to n/N times the predetermined transmission rate.

2. The method for transmitting the communication data according to claim 1, wherein the special data is fabricated by communication wire continuous dominant levels of a number of N more than the transceiving bit number of n of communication wire continuous dominant levels, set in a character as one unit of the communication data.

3. A device for transmitting communication data, the device comprising: a data control unit for transmitting the data at a predetermined transmission rate by Universal Asynchronous Receiver/Transmitter (UART) and a serial communication interface for transmitting the data from the data control unit to a communication wire, wherein only when a special data having a bit number of N more than a transceiving bit number of n, set in a character as one unit of the data is sent, the predetermined transmission rate is changed to n/N times the predetermined transmission rate.

4. The device for transmitting the communication data according to claim 3, wherein the special data is fabricated by communication wire continuous dominant levels of a number of N more than the transceiving bit number of n of communication wire continuous dominant levels, set in the character as one unit of the data.

5. A method for transmitting communication data at a predetermined transmission rate by Universal Asynchronous Receiver/Transmitter (UART), the method comprising: when an intercharacter time is required between characters, which are one unit of the data, transmitting the data after adding a bit number satisfying the intercharacter time to a stop bit number in the characters defined on a transceiving side, wherein the characters together with the added bit number are transmitted in a communication frame.

6. A method for transmitting the communication data according to claim 5, wherein the intercharacter time between the characters is a time duration of a communication wire recessive level.

7. The method according to claim 5, wherein said added bit number satisfies intercharacter time between two characters of said characters transmitted in a single communication frame, wherein said one unit of data comprises a respective character, the stop bit and the added bit number satisfying the intercharacter time, and wherein said one unit of data is transmitted in the single communication frame after the bit number satisfying the intercharacter time is added to the stop bit.

8. A device for transmitting communication data, the device comprising: a data control unit for transmitting the data at a predetermined transmission rate by Universal Asynchronous Receiver/Transmitter (UART) and a serial communication interface for sending the data from the data control unit to a communication wire, wherein when an intercharacter time is required between characters, which are one unit of the data, the data are transmitted after adding a bit number satisfying the intercharacter time to a stop bit number in the characters defined on a transceiving side, wherein the characters together with the added bit number are transmitted in a communication frame.

9. The device for transmitting the communication data according to claim 8, wherein the intercharacter time between the characters is a time duration of a communication wire recessive level.

10. The device according to claim 8, wherein said added bit number satisfies intercharacter time between two characters of said characters transmitted in a single communication frame, wherein each character forms said one unit of data, wherein said one unit of data comprises a respective character, the stop bit and the added bit number satisfying the intercharacter time, and wherein said one unit of data is transmitted in the single communication frame after the bit number satisfying the intercharacter time is added to the stop bit.

11. The device according to claim 8, wherein the device executes said transmitting of the data without involving a microcomputer processing unit for the intercharacter time.

12. A method for transmitting communication data at a predetermined transmission rate by Universal Asynchronous Receiver/Transmitter (UART), the method comprising:
 transmitting data comprising a plurality of characters in a communication frame,
 wherein, each of the plurality of characters is one unit of said data,
 wherein said one unit of data comprises at least one stop bit, and
 wherein, when an intercharacter time is required between said plurality of characters, prior to said transmission, adding a bit number satisfying the intercharacter time to said at least one stop bit,
 wherein said one unit of data further comprises the intercharacter time.

* * * * *

UNITED STATES PATENT AND TRADEMARK OFFICE
CERTIFICATE OF CORRECTION

PATENT NO. : 7,733,947 B2 Page 1 of 1
APPLICATION NO. : 10/117097
DATED : June 8, 2010
INVENTOR(S) : Katsuyuki Sumimoto It is certified that error appears in the above-identified patent and that said Letters Patent is hereby corrected as shown below:

Title Page, Item (75) and under Item (12)
Inventor: delete "Katsuyuki Sumitomo, Tokyo (JP)" and
insert --Katsuyuki Sumimoto, Tokyo (JP)--

Signed and Sealed this

Sixteenth Day of November, 2010

David J. Kappos
*Director of the United States Patent and Trademark Office*